US006746018B2

(12) United States Patent
Lewis et al.

(10) Patent No.: US 6,746,018 B2
(45) Date of Patent: Jun. 8, 2004

(54) SHAFT SEAL

(75) Inventors: Michael L. Lewis, Maysville, KY (US); Christopher A. Carrigan, Maysville, KY (US); Erwin R. Carrigan, Manchester, OH (US); Steven H. Griggs, Maysville, KY (US)

(73) Assignee: Emerson Power Transmission Manufacturing, L.P., Maysville, KY (US)

( * ) Notice: Subject to any disclaimer, the term of this patent is extended or adjusted under 35 U.S.C. 154(b) by 0 days.

(21) Appl. No.: 10/080,259

(22) Filed: Feb. 21, 2002

(65) Prior Publication Data

US 2003/0155718 A1 Aug. 21, 2003

(51) Int. Cl.[7] .............................. F16J 15/32

(52) U.S. Cl. .............. 277/349; 277/351; 277/353; 277/549; 277/562

(58) Field of Search .............. 277/346, 349, 277/351, 352, 353, 549, 562

(56) References Cited

U.S. PATENT DOCUMENTS

| | | | | | |
|---|---|---|---|---|---|
| 3,703,296 | A | * | 11/1972 | Malmstrom | 277/402 |
| 4,277,072 | A | * | 7/1981 | Forch | 277/404 |
| 4,428,586 | A | * | 1/1984 | Romero | 277/565 |
| 4,848,776 | A | * | 7/1989 | Winckler | 277/349 |
| 5,028,054 | A | * | 7/1991 | Peach | 277/348 |
| 5,129,744 | A | * | 7/1992 | Otto et al. | 384/486 |
| 5,183,269 | A | * | 2/1993 | Black et al. | 277/349 |
| 5,219,434 | A | * | 6/1993 | Von Bergen et al. | 277/351 |
| 5,667,333 | A | * | 9/1997 | Phillips | 403/369 |
| 6,257,587 | B1 | * | 7/2001 | Toth et al. | 277/309 |
| 6,375,196 | B1 | | 4/2002 | Phillips | |

OTHER PUBLICATIONS

Product Information—Dodge Torque–Arm II Catalog Supplement, 2001, 3 pages.

Product Information—Rexnord—Link–Belt Shaft Mounted Speed Reducers, 1996, 3 pages.

Product Information—Falk—Quadrive, on or before Apr. 2002, 3 pages.

* cited by examiner

*Primary Examiner*—Anthony Knight
*Assistant Examiner*—E Peavey
(74) *Attorney, Agent, or Firm*—Harness, Dickey & Pierce, P.L.C.

(57) ABSTRACT

A multiple shaft seal arrangement positioned between a shaft and an inside diameter surface of an aperture in a wall. The multiple shaft seal arrangement has a flinger attached to the shaft with a face seal mounted to the flinger. A double lip oil seal is mounted to the inside diameter of the aperture. The flinger is positioned such that the face seal is pressed against the double lip oil seal. Accordingly, rotation of the shaft causes rotation of the flinger and face seal. This centrifugally throws contaminants, such as particulate matter, away from the aperture. The void between the face seal and the inside diameter of the aperture is filled with grease or similar substance. The combination of these elements greatly prohibits debris, moisture, particulate matter or other environmental elements from passing from one side of the multiple shaft seal arrangement to the other.

6 Claims, 3 Drawing Sheets

12
14
16
20

SHAFT SEAL

FIELD OF THE INVENTION

The present invention generally relates to a shaft seal, and, more specifically, to a shaft seal that provides a high resistance to infiltration of contaminants from one side of the shaft seal to the other side of the shaft seal.

BACKGROUND OF THE INVENTION

Many mechanical devices have shafts that extend from a housing. Conventionally, the housing is filled with fluid or lubricant. The shafts which pass through the housing wall drive or may be driven by an external component. A gear set or other mechanical device that modifies the rotational energy, torque or speed supplied from one shaft to another shaft is located inside of the housing. These devices must be fluidly sealed from the external environment to ensure that contaminants do not enter the housing. Also, the housing is sealed from the inside so that fluid does not leak from the housing to the external environment. It is difficult to seal the housing with the rotating shaft since space is required between the shaft and housing to allow for rotation. Fluid seals are positioned between the shaft and the wall of the housing to aid in fluidly sealing this space. Typically, these seals are donut like with a through bore. The inner diameter surface of the seal presses against the seal area of the shaft. The outer diameter surface of the seal engages an aperture formed in the housing wall. As a result, the shaft rotates and slides against the fluid seal. The fluid seal presses against the seal area of the shaft and against the housing wall to form a barrier between the inside of the housing and the external environment.

While such devices serve well to seal one side of the seal area from the other, drawbacks exist by virtue of spacing between the seal and shaft. Specifically, the natural spacing that exists between the shaft and the seal area can allow a small amount of contaminants to pass from one side of the seal to the other. Although small in quantity, these contaminants can substantially increase the amount of wear between the seal and shaft. Also, the matter can damage internal components within the housing. In addition, the exterior side of the seal is typically exposed to the outside environment which often contains elements detrimental or damaging to the seal such as sunlight, moisture, dust, debris or other airborne materials. The present invention was developed in light of these and other drawbacks.

SUMMARY OF THE INVENTION

To address these and other drawbacks, the present invention provides a multiple shaft seal arrangement positioned between the shaft and the inside diameter of an aperture in the housing wall. The multiple shaft seal arrangement includes a disc mounted to the outside diameter of the shaft. The disc extends radially outward to a position spaced from the inside diameter of the aperture. One side of the disc faces the external environment. A face seal is mounted to an opposite side of the disc. A second disc extends from the inside diameter of the aperture to a position spaced from the outside diameter of the shaft. The face seal abuts the second disc to prohibit debris from passing from one side of the multiple shaft seal arrangement to the other side. A seal is attached to the second disc and abuts the outside diameter of the shaft. Accordingly, the multiple shaft seal arrangement prohibits particulate matter and other debris from passing from one side of the wall to the other side.

In another aspect, a speed reducer with a housing includes an aperture in a housing wall. A shaft passes through the aperture. A multiple shaft seal arrangement is positioned between the shaft and the wall defined by the aperture. The multiple shaft seal arrangement includes a disc mounted to the outside diameter of the shaft. The disc extends radially outward to a position spaced from the inside diameter of the aperture. One side of the disc faces an external environment of the housing. A face seal is mounted to an opposite side of the disc. A second disc extends from the inside diameter of the aperture in a direction radially toward the shaft. The face seal presses against the second disc. A seal is attached to the second disc and presses against the outside diameter of the shaft.

In another aspect, a method is disclosed to position a multiple shaft seal arrangement between the wall defined by an inside diameter of an aperture and the outside diameter surface of a shaft. The method utilizes the following steps. The shaft is positioned in the aperture. Next, a seal is mounted to the inside diameter of the aperture. A face seal is then attached to a side of a flinger and the flinger/face seal assembly is mounted to the shaft such that the assembly rotates with the shaft and the face seal presses against the seal.

Further areas of applicability of the present invention will become apparent from the below detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
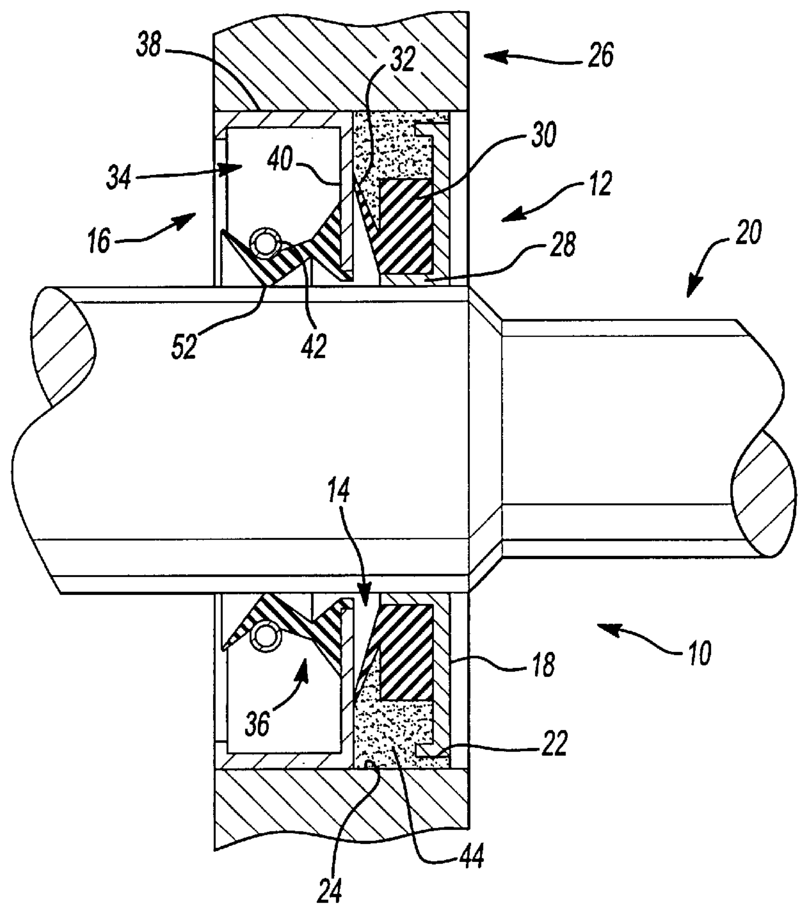
FIG. 1 is a cross sectional view of a multiple shaft seal arrangement according to the present invention.

Referring now to FIG. 1, a multiple shaft seal arrangement according to the present invention is shown and designated with the reference numeral 10. The multiple shaft seal arrangement 10 is positioned between a wall 26 and a shaft 20 to seal the internal environment 50 on one side of the wall 26 from the external environment 46 on a second side of the wall 26. Multiple shaft seal arrangement 10 allows shaft 20 to rotate within wall 26 while minimizing the amount of matter 48 that passes from external environment 46 to internal environment 50.

The multiple shaft seal arrangement 10 generally includes a flinger 12, a face seal 14 and a seal 16. The finger 12 includes a disc 18, external cup area 22, and a mounting area 28. The disc 18 is mounted on and extends radially from the shaft 20. The external cup area 22 is at a radially outward portion of disc 18 and is positioned in close proximity to the inside diameter of aperture 24. The close proximity of external cup area 22 to the inside diameter of aperture 24 provides a minimal gap to enable rotation of the shaft while preventing material from passing through the gap.

External cup area 22 preferably extends away from disc area 18 in a direction along the inside diameter of aperture 24. As a result, a large surface of external cup area 22 faces the inside diameter of aperture 24. This, helps to reduce the amount of matter that passes between external cup area 22 and the inside diameter of aperture 24. However, alternate designs and arrangements may be used other than the external cup disclosed in the present application. Or, no external cup may be used if so desired.

Shaft mounting flange 28 extends radially inward from the disc area 18. Shaft mounting flange 28 preferably extends along shaft 20 to provide a surface for a press fit attachment between the flinger 12 and shaft 20. Shaft mounting flange 28 supports face seal 14 on an interior surface.

Face seal 14 is preferably made of rubber and has a mounting portion 30 and a seal lip 32. Mounting portion 30 is preferably elastic and is able to be stretched over the outer diameter of shaft mounting flange 28. Accordingly, mounting portion 30 elastically presses against the shaft mounting flange 28 to create increased friction between the mounting portion 30 and shaft mounting flange 28 to maintain the face seal 14 as part of the flinger 12. The mounting portion 30 may be attached to a back side of the disc area 18 and also to interior surface of shaft mounting flange 28. Such attachment may be accomplished by adhesion, glue or any other known means. Moreover, mounting portion 30 may be attached to either the disc area 18 or the shaft mounting flange 28 and not attached to both. Furthermore, mounting portion 30 can be attached to flinger 12 by any other known means and is not limited to the description disclosed herein.

Seal lip 32 is conically shaped and extends away from the mounting portion 30. Preferably, seal lip 32 and mounting portion 30 are formed as a one piece unit. As will be discussed in greater detail, seal lip 32 is pressed against seal 16 such that seal lip 32 exhibits an elastic force against seal 16.

Seal 16 includes a bracket portion 34 (preferably made of metal), a seal area 36, and a spring 42. Bracket portion 34 has a cup area 38 and a support 40. Cup area 38 has an outside diameter that press fits into the aperture 24. This serves to mount the entire seal 16 in the wall 26. Support 40 extends radially inward from the cup area 38.

Seal area 36 is attached to support 40 by adhesion, glue or other known means of attachment. Spring 42 extends around an outer circumference of the seal area 36 to press the lip 52 against the outer surface of the shaft 20. This provides a fluid barrier and sealing action from one side of the multiple shaft seal arrangement 10 to the other. It is noted that seal 16 can be any type of oil seal known in the art including a single lip or double lip oil seal.

Grease or another similar substance is positioned within the space 44, defined by wall 26, flinger 12, face seal 14, and seal 16. As will be discussed, the grease or other substance within space 44 helps prohibit material from passing from one side of multiple shaft seal arrangement 10 to the other.

When assembled, flinger 12 is press fit onto an outer surface of shaft 20 and rotates with shaft 20. As mounting portion 30 of face seal 14 is also attached to flinger 12, it also rotates with the rotation of shaft 20 and flinger 12. Seal 16 is press fit into aperture 24 of wall 26. Therefore, seal 16 is rotationally fixed and does not rotate with shaft 20. Instead, lip 52 slides against the outer surface of shaft 20.

Figure 4:
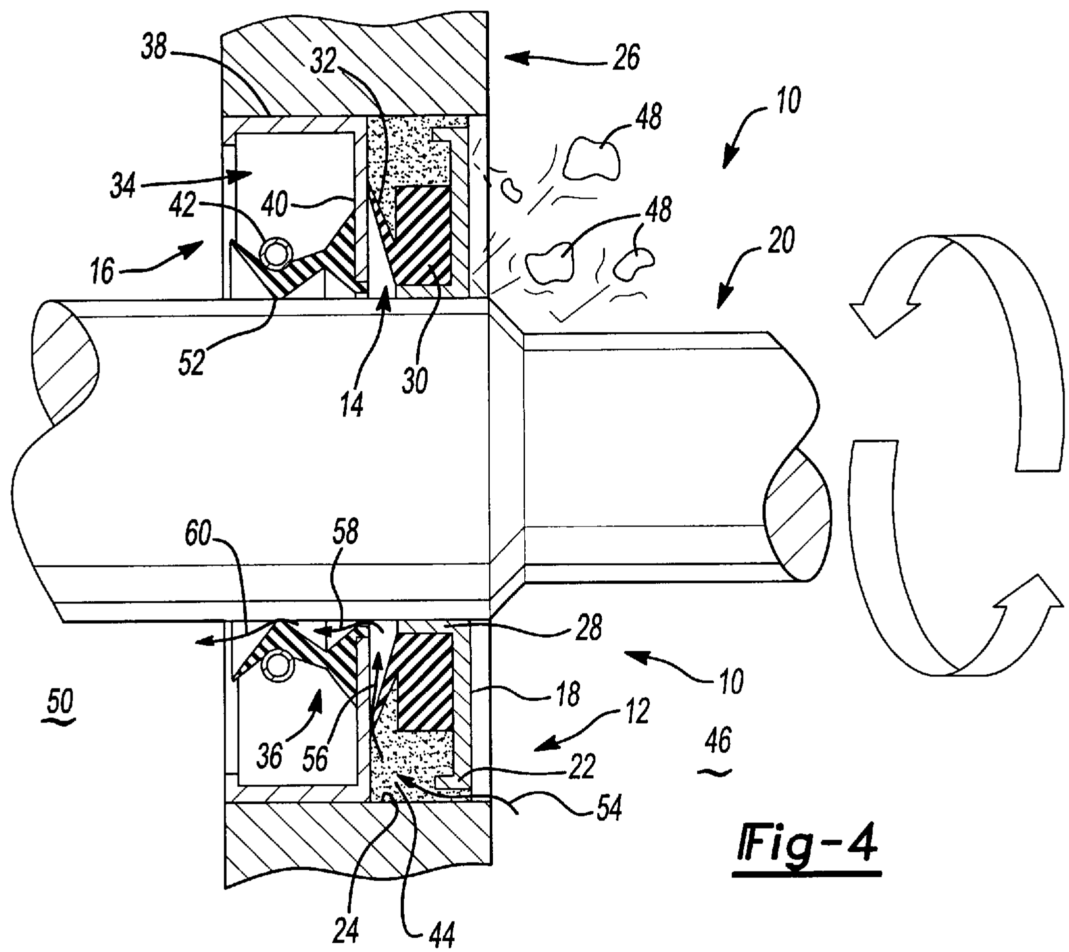
FIG. 4 is a cross sectional schematic view of the application of a multiple shaft seal arrangement according to the present invention.

In operation, shaft 20 is rotated, causing rotation of flinger 12 and face seal 14. The disc area 18 of flinger 12, by centrifugal force, throws matter 48 away from the disc area 18 as shown in FIG. 4. This removes matter from the general area of multiple shaft seal arrangement 10. Additionally, the centrifugal force throws the grease to the outermost area of the flinger, thereby plugging up the gap between the cup portion 22 and wall surface 24. This, again, helps minimize the amount of matter that passes through the gap.

Due to the rotation of shaft 20 with respect to wall 26, some space must exist between shaft 20 and the wall 26. Multiple shaft seal arrangement 10 serves to minimize this space and reduce the possibility of matter, such as matter 48, from traveling from external environment 46 to internal environment 50. However, a path still exists as illustrated by the arrows in areas 54, 56, 58 and 60, which also represents the large number of areas that matter must pass through to get to internal environment 50. This large number of areas is generally created by all the elements in the multiple shaft seal arrangement 10. The large number of areas through which the matter 48 must pass makes it difficult for matter 48 to pass to internal environment 50.

Specifically, matter must first pass through area 54. Here, matter must pass between the small space provided between external cup area 22 and aperture 24. As a further barrier at area 54, the rotational energy of disc area 18 throws matter 48 away from the general area of disc area 18. Also, space 44 is filled with grease or other material. Therefore, matter 48 must pass through the entire area of grease before even arriving at area 56. Next, matter 48 must pass through area 56. Here, the elastic force of seal lip 32 against support 40 creates an additional barrier which matter 48 must pass through. If matter 48 manages to pass through area 54, the grease in space 44 and area 56, it must next pass through areas 58 and 60. At area 60, the tightening force of spring 42 clamps lip 52 against the outer surface of shaft 20 to create a further barrier. Accordingly, multiple shaft seal arrangement 10 according to the present invention creates a substantial barrier to prevent matter 48 from passing from external environment 46 to internal environment 50.

Figure 2:
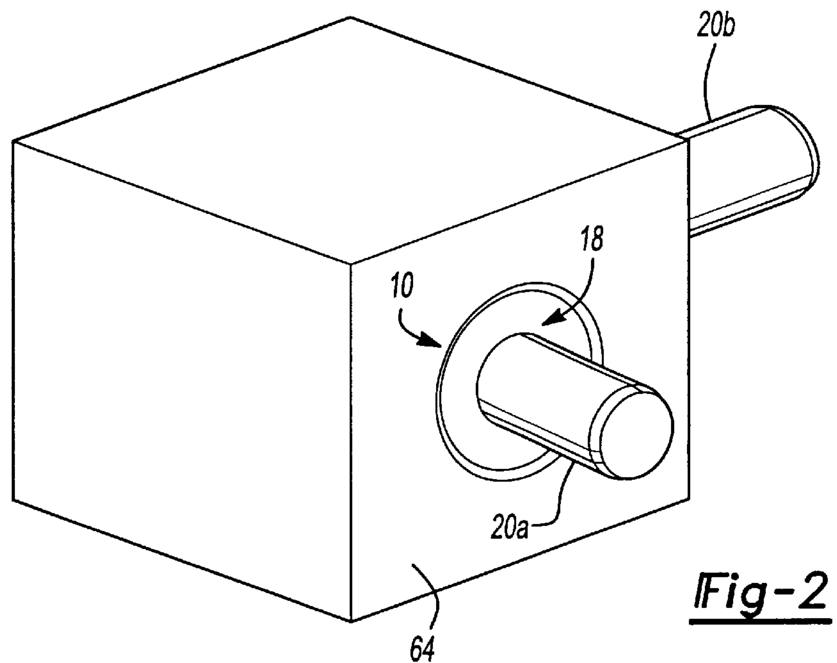
FIG. 2 is a perspective view of a speed reducer including a multiple shaft seal arrangement according to the present invention.

With respect to FIG. 2, a speed reducer 62 is shown having shafts **20*a* and 20*b* passing through housing 64. The walls of housing 64 operate as wall 26 in FIG. 1 and the multiple shaft seal arrangement 10 serves to allow rotation of shafts 20*a* and 20*b* while maintaining matter external to the housing 64 from entering the speed reducer 62**.

Figure 3:
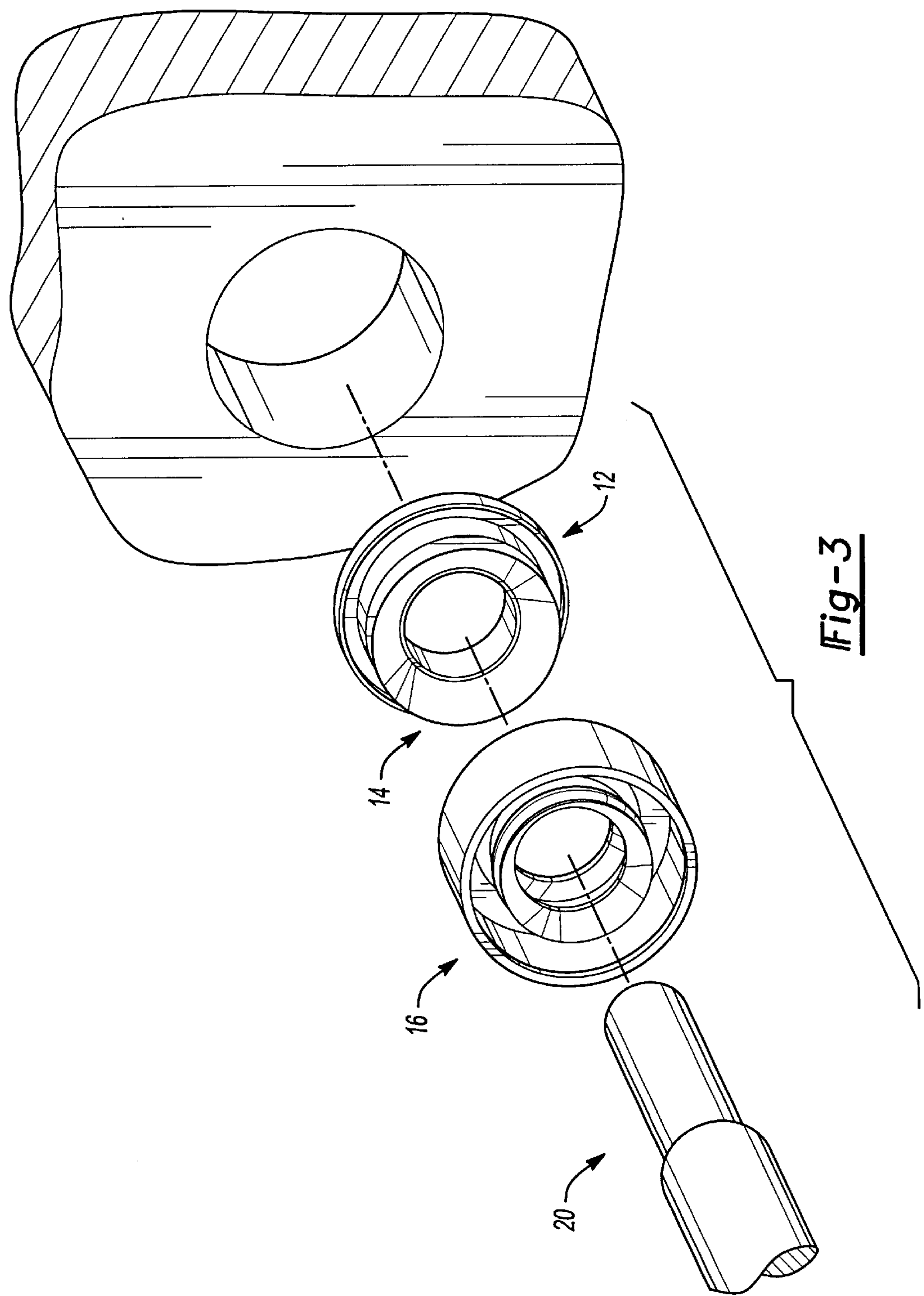
FIG. 3 is an exploded perspective view of a multiple shaft seal arrangement according to the present invention.
Figure 5:
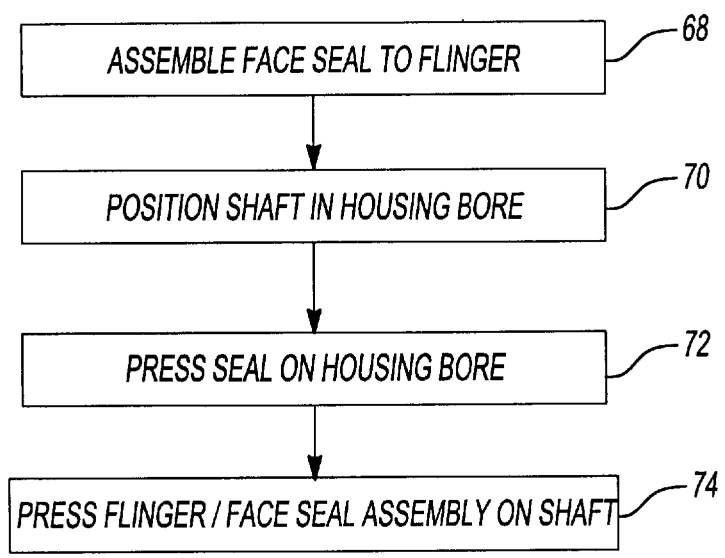
FIG. 5 is a flow diagram for the assembly of a multiple shaft seal arrangement according to the present invention.

Referring now to FIGS. 3 and 5, the assembly of the present invention is shown and described. In step 68 of FIG. 5, the face seal 14 is first attached to the flinger 12 by any of the methods described previously. Next, the shaft 20 is positioned in the housing bore in step 70. However, it is noted that the order of steps 68 and 70 can be reversed or the operations can be performed simultaneously. The positioning of the shaft 20 in step 70 places the shaft 20 at the proper location in the aperture 24. The seal 16 is then pressed into the aperture from the external environment as the internal environment is preferably sealed by this point by the wall 26. The seal is preferably pressed into the aperture 24 to a predetermined recessed distance from the outer surface of the wall 26. The amount of this recess is selected to distance the face seal 14 from the oil seal such that the seal lip 32 is pressed against the seal 16, while at the same time, the recess is also selected to position the flinger close enough to the outside of the wall 26 to ensure that the minimal gap exists between the outer diameter of the flinger 12 and the inside diameter of the aperture. More specifically, the recess preferably positions the outside surface of the flinger 12 flush with the outside surface of the wall 26. As a result, the flinger 12 does not stick out from the wall 26 and allow matter to pass therebetween. However, it is noted that variations in the dimensions of the recess can exist, and that the present application is not limited to that disclosed herein.

Accordingly, in step 74, the flinger 12 and face seal 14, as an assembled unit, is pressed onto shaft 20. Preferably, between steps 72 and 74, grease 44 is filled between flinger 12 and face seal 14. However, it is noted that grease 44 is not a necessary element and it may be omitted.

Accordingly, in the above described invention, a sealing arrangement is provided that minimizes the amount of contaminants or dirt that may pass from one side of a wall to another where the wall contains a rotating shaft.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A speed reducer comprising:

a housing having an aperture, an outside of the housing defining an external environment and an inside of the housing defining an internal environment, the aperture passing from the external environment to the internal environment;

a shaft passing through the aperture;

a multiple shaft seal arrangement positioned between an outer diameter of the shaft and an inside diameter of the aperture, the multiple shaft seal arrangement comprising:

a disc mounted and rotatably affixed to the outer diameter of the shaft such that the disc rotates with the shaft, the disc extending radially from the shaft to a terminating position spaced from the inside diameter of the aperture, the disc having a first side facing the external environment and a second side oppositely disposed from the first side;

a face seal having a face seal lip and being mounted and rotatably affixed to the second side of the disc, wherein the face seal rotates with the disc and wherein the face seal lip is radially spaced further from the inside diameter of the aperture than the terminating position;

a second disc mounted to the inside diameter of the aperture and extending radially toward the shaft, the second disc spaced from the outside diameter of the shaft, the face seal pressed against the second disc; and an oil seal mounted to the second disc which is pressed against the outer diameter of the shaft.

2. The speed reducer as claimed in claim 1, wherein the face seal is constructed of rubber and the oil seal lip is constructed of rubber.

3. The speed reducer as claimed in claim 1, further comprising grease disposed in a space defined by the disc, second disc, face seal and inside diameter of the aperture.

4. The speed reducer as claimed in claim 3, wherein the disc further comprises a cup area extending from a radial outward position of the disc in a direction axially along the inside diameter of the aperture.

5. The speed reducer as claimed in claim 1, wherein the disc further comprises an external cup area that extends from a radial outward position of the disc in a direction axially along the inside diameter of the aperture.

6. A method for assembling a multiple shaft seal arrangement between an inside diameter of an aperture in a wall and a shaft, the method comprising the steps of:

positioning the shaft in the aperture;

press fitting an oil seal in the aperture;

attaching and rotatably affixing a face seal having a face seal lip to a side of a flinger to form a flinger/face seal assembly;

press fitting the flinger/face seal assembly onto the shaft such that the flinger/face seal assembly is rotatably affixed to the shaft and oriented with respect to the oil seal such that the face seal presses against the oil seal; and positioning grease in a space between the face seal lip and the inside diameter of the aperture.

* * * * *

UNITED STATES PATENT AND TRADEMARK OFFICE

CERTIFICATE OF CORRECTION

PATENT NO. : 6,746,018 B2
DATED : June 8, 2004
INVENTOR(S) : Michael L. Lewis et al.

It is certified that error appears in the above-identified patent and that said Letters Patent is hereby corrected as shown below:

Column 2,
Line 67, "finger" should be -- flinger --.

Signed and Sealed this

Twenty-first Day of September, 2004

JON W. DUDAS
*Director of the United States Patent and Trademark Office*